United States Patent

Laing

[15] 3,683,152
[45] Aug. 8, 1972

[54] MEANS FOR PREVENTING THE FORMATION OF ICE, PARTICULARLY ON ROADS

[72] Inventor: Nikolaus Laing, Hofener Weg 35-37, 7141 Aldingen, near Stuttgart, Germany

[22] Filed: Jan. 27, 1970

[21] Appl. No.: 6,267

[30] Foreign Application Priority Data

Feb. 3, 1969 Austria....................1073/69

[52] U.S. Cl. ..................219/213, 165/104, 219/341
[51] Int. Cl................................................H05b 1/00
[58] Field of Search......219/213, 378, 365, 341, 530, 219/540; 126/204, 263, 400; 165/45, 104, 134; 237/1

[56] References Cited

UNITED STATES PATENTS

| 3,195,619 | 7/1965 | Tippmann..............165/45 X |
| 2,677,664 | 5/1954 | Telkes...................126/400 X |
| 3,079,087 | 2/1963 | Herrick et al................237/1 |
| 2,677,243 | 5/1954 | Telkes............................62/4 |

Primary Examiner—C. L. Albritton
Attorney—Pennie, Edmonds, Morton, Taylor and Adams

[57] ABSTRACT

Means for preventing the formation of ice on external surfaces endangered by frost comprising a heat storage body having a melting point slightly above the freezing point of water. This heat storage body is in heat conductive communication with the external surface and stores the energy radiated by the sun during the day by melting, this energy being given out again as soon as the temperature of the surface approaches the threshold of 0° C.

17 Claims, 6 Drawing Figures

PATENTED AUG 8 1972 3,683,152

INVENTOR

MEANS FOR PREVENTING THE FORMATION OF ICE, PARTICULARLY ON ROADS

DESCRIPTION OF THE INVENTION

The invention relates to means for preventing the formation of ice on roads, bridges, steps, paths and the like.

Ice is formed on surfaces intended to be walked on, such as roads, steps, bridges, balconies and also roofs, either when the temperature of a previously wetted surface drop, particularly through radiation in the evening, or through rain falling on to a supercooled surface when the weather breaks.

The statistic frequency of the causes of accidents on the roads caused by ice, is, in over 70 percent of all cases, attributable to supercooling of the road surface by radiation after sunset. Experience shows that the surface temperature has a daytime temperature range of 10° to 20° C on sunny days, and of about 7° C on very cloudy days. Hence, if the temperature does not drop below freezing until the evening, whereupon ice formation can occur, the highest daytime temperature often lies well above freezing point, and also the mean daytime temperature is in any event above freezing point. The winter sun still supplies energy at the rate of approximately 300 to 500 W/m²h. The object of the invention is the utilization of the energy radiated by day in order to keep the roads free from ice.

Roads are known in which the formation of black ice is prevented by means of electric heating. This involves extraordinarily high energy costs an a large investment. Proposals have also become known, according to which the heat stored in the earth below the road surface during the warm season is supplied to the road surface by means of suitable heat conducting systems during the cold season. These systems suffer from the disadvantage that this quantity of heat in the earth is used up in the course of a few frosty days, so that they merely postpone the onset of the period of icing-up.

The invention avoids these disadvantages, in that it primarily stores the energy radiated by the sun during the day by melting ion lattice salts, this energy being given out again in the form of heat of crystallization as soon as the temperature of the road surface approaches the threshold of 0°.

The storage mass envisaged by the invention preferably comprises hydrates of ion lattice salts whose temperature of crystallization lies a few degrees above the freezing point of water. Preferably the temperature of crystallization should exceed the freezing point by not more than the temperature gradient between the storage means and the road surface. In the case of road surfaces of good heat conductivity, the optimum temperature of crystallization has been found to be about +6° C. For this temperature the invention envisages a storage mass comprising a decahydrate of the double salt formed of 1 mol of sodium suphate and 1 mol of potassium chloride. Since all salts comprising a ion lattices have a temperature of crystallization below the melting point, on account of the melt being metastable in the intermediate temperature range, the invention provides for the addition of uniformly distributed isotypical or epitaxial crystals for inoculating the storage mass; the minutest quantities suffice. In this way the temperature of crystallization is raised to the vicinity of the melting point. Most of the hydrates which may be considered for use as the storage mass do not remain homogenous, since the water of crystallization is given off at the melting point, so that, in the case of the said double salt, sulphates and particularly also the insoluble inoculation crystals can become concentrated in preferential layers through stratification. Thereby the crystallization is displaced to very low temperatures, so that the ice inhibiting effect is eliminated. The invention therefore envisages providing the storage mass with a support structure, so that the solid state character is also maintained above the melting point. During the day the storage mass absorbs heat from the sun as soon as the point of crystallization has been reached and no further change in its temperature occurs once the melting point has been reached, right up to being fully charged. In this way the road surface remains cooler by day than the surface of roads not provided with storage masses. At the same time only a smaller portion of the heat from the sun is given off to the air than with normal roads. Now as soon as the temperature of the road surface drops to a value differing from the temperature of crystallization of the storage mass by the requisite temperature difference for heat conduction, though still somewhat above the freezing point, crystallization, and with it liberation of the heat which had been stored during the day, commences. It has been found that only comparatively small amounts of storage mass are required to prevent the formation of ice.

Electrically heated roads, steps etc. in combination with storage masses according to the invention can also be realized. In this case in the majority of all cases, energy from the sun is used for the heating up and only in the rare cases of ice formation as a result of rain on supercooled roads or also for the purpose of removing snow, is electrical energy used after the storage bodies have become discharged.

By contrast with conventional electric heating arrangements for roads, the electric power rating can be appreciably lower, since the heating energy can be fed in over a longer period. Moreover heating up can be confined to the night time low tariff periods. It is also possible, according to the invention, to enable heating up in a very short time by means of any desired heating medium e.g. hot oil or water. This is of particular interest for paths, steps etc. where snow presents an extreme hazard.

Finally, the invention also envisages solutions in which the heat absorbing and heat emitting heat exchanger arranged in the road surface communicates with the storage mass via heat transmitting means, suitable means being provided for permitting this heat transmission only when the meteorological conditions are such that absorption or emission of heat is desired.

The characteristics of the invention will now be described with reference to illustrations, but the invention is not limited to the combination of characteristics described.

DETAILED DESCRIPTION OF THE INVENTION

Figure 1:
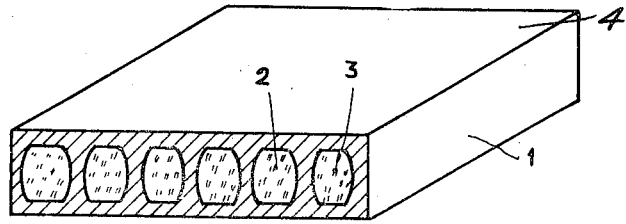
FIG. 1 shows a section through a plate for a foot path having storage bodies according to the invention.

FIG. 1 shows a plate for a foot path, whose support structure 1 consists of concrete and whose longitudinal cavities of barrel-shaped cross-section form storage bodies 2 which are filled with a storage mass 3. At their axial ends the cavities 3 are sealed by means of closures (not shown), e.g. sheets of plastics material. In order to avoid stored heat escaping into the ground, the plates are placed on insulating bases (not shown). The surface 4 of the plate is the surface upon which the formation of ice is to be prevented.

Figure 2:
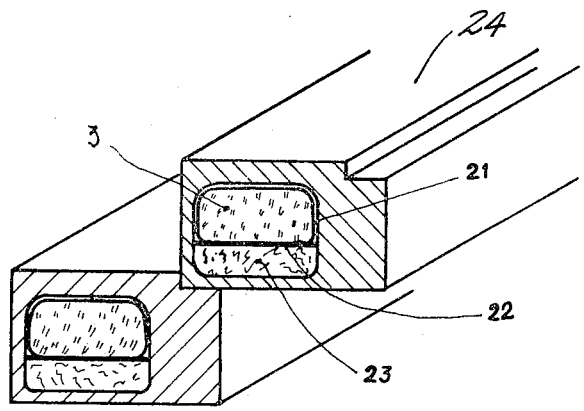
FIG. 2 shows a section through steps having storage bodies according to the invention.

FIG. 2 shows a staircase construction, in which the steps are also hollow and the cavities are filled with a storage mass 3, accommodated in plastic tubes 21 and where the step has a surface 24 upon which the formation of ice is to be prevented. Beneath the storage mass 3 and electric heating installation 22, preferably a metallized plastics foil, is arranged, and beneath this a heat insulating layer 23. By thermostatic control the storage mass 3 is continuously maintained at a temperature slightly above its temperature of crystallization. Since the ambient temperature drops below the minimum temperature required for maintaining the charge on only few days of the year, the power consumption is negligible; moreover charging can be confined to the hours when a favorable tariff applies, and forthermore, in order to avoid unnecessary heat losses, the power can be switched off during periods of very low temperature when there is no rain- or snowfall in any case.

Figure 3:
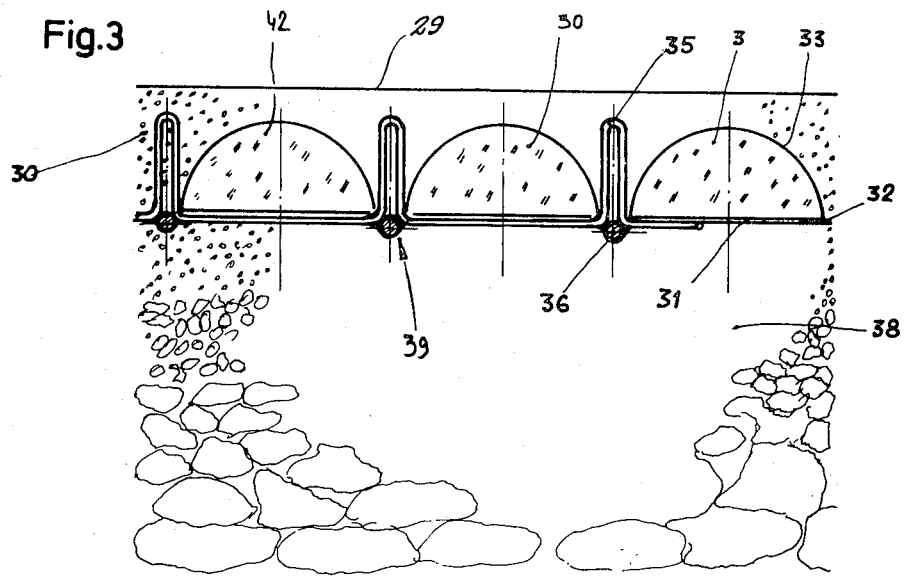
FIG. 3 shows a section through a road structure having storage plates according to the invention.

FIG. 3 shows a section through a road according to the invention having a surface 29 upon which the formation of ice is to be prevented. A steel lattice 35, 36 is firmly connected to the foundation 38. A mat 32 is laid on this steel lattice, the mat consisting of a flat foil 31 of plastics material and a foil 33 of plastics material which is provided with hemispherical bulges and welded to the latter at their contiguous surfaces; its cavities 30 contain a storage mass 3. The loops 35 of the reinforcing wire protrude through the mat 32 through openings 39 left between the bulges 42. After the mat has been laid out, the road surface 30, which is anchored to the foundation by means of the loops 35, is filled in.

Figure 4:
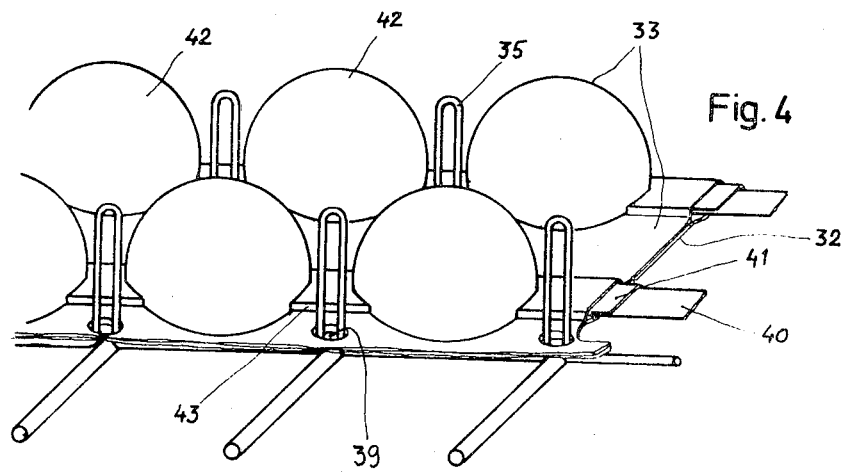
FIG. 4 shows in perspective view a road structure similar to that of FIG. 3 with spheroidal storage bodies and supplementary electric heating.

FIG. 4 shows the same arrangement as FIG. 3, but additional flat tapes 40 of electrical resistance material are provided which are electrically insulated by means of a plastics coating 41. These insulated flat tapes are inserted between the lower laxer 31 and the upper layer 33 of the welded up foils and thus enclosed in watertight manner. The regions 43 between two bulges 42 containing storage mass naturally require appreciably less heat than the regions inside the bulges 42. Hence the invention envisages selecting a higher resistance for the flat tape 40 inside the bulges 42 than in the intermediate regions 43. The electric heating arrangement serves thermally to charge the storage mass 3 if either such large quantities of snow are expected that the stored energy would be insufficient to melt it, or the temperature of the road is below freezing point and rain is expected. In all other cases charging is accomplished by the sun's energy.

Figure 5:
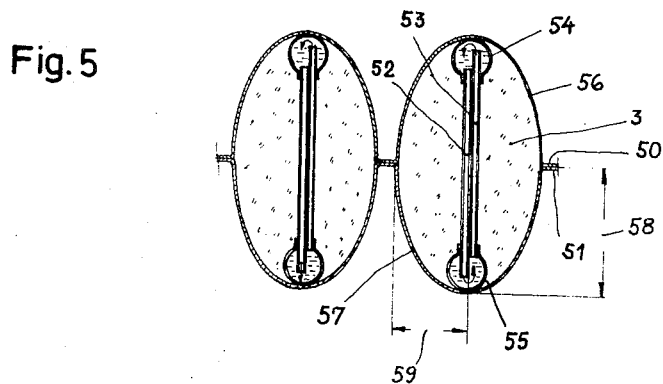
FIG. 5 shows a section through a further form of storage bodies according to the invention.

FIG. 5 shows a different form of mat of storage mass. The plastics foils 50 and 51 are arranged in mirror image formation, so that the road foundation 38 must have corresponding recesses. Moreover the statically more favorable form of the ellipsoid of rotation was chosen, which makes possible the accommodation of a larger amount of storage mass 3 for a given transmittable load on the road surface. Since this form extends over a larger vertical region, the heat transmission is partly done by a circuit made up of two tubes 52, 53 which are relatively displaced vertically and two hollow bodies 54, 55 connecting the tube ends together. Inside this circuit there is a liquid, e.g. a water - methyl alcohol mixture, which transmits a portion of the heat of the storage mass upwards by convection, the heat transmission during charging being assisted by the thermal conductivity of the tubes 52, 53.

Figure 6:
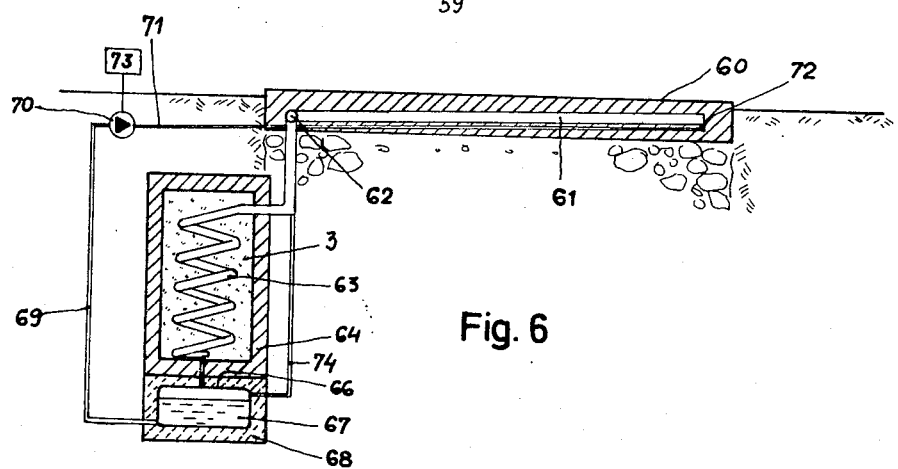
FIG. 6 shows a diagrammatic section of an arrangement for protecting road surfaces according to the invention and having a heat conducting circuit.

FIG. 6 shows a circuit diagram of a further inventive solution, in which heat exchanger tubes 61 are arranged just below the road surface 60 in close proximity to each other, the tubes 61 being connected together by piping 62. The tube 61 communicate with a heat exchanger 63 arranged in a storage mass container 64 and in good heat conducting communication with the storage mass 3 via piping 62. The storage mass container 64 is well insulated from the ambient temperature, preferably by being buried to an appropriate depth in the ground. The lowest point of the heat exchanger 63 leads into a tank 66, which is surrounded by a layer 68 of very good insulating quality. From the lowest point of the tank 66 a conduit 69 leads to a pump, which is connected to the ends 72 of the heat exchanger tubes 61 via a conduit 71. The pump 70 is operated by a drive (not shown). The entire conduit system is sealed in a vacuum tight manner against its environment and preferably contains no air. The tank 66 contains a volatile liquid 67 having a freezing point below 0° C. As soon as the ambient temperature has risen above the melting point of the storage mass 65, the pump 70 is switched on thermostatically by means of the controller 73. Thereby the liquid 67 enters the heat exchanger tubes 61 where it evaporates. The vapor so formed condenses in the heat exchanger 63 and the heat of condensation causes the storage mass 3 to melt. The controller 73 for operating the pump 70 is meant to respond to the factors necessary for possible ice formation, such as humidity of the road surface, temperature and temperature gradient, and should also take into account meteorological readings, such as rain when the road is super cooled, and to switch on the pump 70 in good time before icing up begins. Thereby liquid 67 is again caused to enter the heat exchanger tube 61, but now, because of the slight gradient of the tube 61, it runs into the heat exchanger 63 where it is evaporated. The vapor is again condensed in the tube 61 and thereby supplies the heat necessary to prevent ice formation, to the road surface 60. Through the conduit 74 a small proportion of the condensate is returned direct to the tank 66, in order that the circulation should die down after the pump 70 has been switched off.

The advantage of this more expensive construction resides in the optimum exploitation of the heat capacity of the storage mass. By contrast with the systems previously described, heat is conducted to the road surface only when all the meteorological conditions for ice formation are present, and moreover only to the extent to which it is necessary for the elimination of the hazards of black ice. This is so because as soon as the road surface has become dry, any further heat removal is suspended, irrespective of the ambient temperature, by switching off the pump 70. With this system also, additional heating can be provided for charging the storage mass, which prevents interruption of operation after periods of inclement weather, where the store is inadequately dimensioned.

I claim:

1. Means for preventing the formation of ice on an external outwardly facing surface endangered by frost, such as the surface of a road, path, staircase, balcony or roof, characterized in that the surface is a solar heat receiving surface which is in heat conductive communication with storage bodies which receive and store solar heat wherein said bodies comprise essentially a storage mass capable of forming ion crystals and wherein the storage mass has a melting point slightly above the freezing point of water.

2. Means for preventing the formation of ice according to claim 1, characterized in that storage bodies (2,20,34,65) are arranged in cavities beneath the outward facing surface.

3. Means for preventing the formation of ice according to claim 1, characterized in that the storage bodies (65) are arranged in containers (64) which are thermally insulated against the exterior, and in that heat exchangers (61) are provided beneath the outward facing surface (60) on the surfacing, which communicate with a heat exchanger (63) which is arranged in the storage body (65), the heat transfer between the two heat exchangers taking place through a flowable heat medium, e.g. a vapor or a liquid.

4. Means for preventing the formation of ice according to claim 3, characterized in that the heat medium consists of a material which is present in vapor form as well as in the form of a condensate (67) at the melting point of the storage mass (3).

5. Means for preventing the formation of ice according to claim 1, characterized in that the melting point of the storage mass (3) in the storage bodies (2, 20, 34, 65) lies between 1° and 10° C.

6. Means for preventing the formation of ice according to claim 1, characterized in that the storage mass (3) is a hydrate of an alkalimetal salt or double salt.

7. Means for preventing the formation of ice according to claim 1, characterized in that the storage bodies consist essentially of the storage mass and substances which do not participate in the change of state and thicken up the melt.

8. Means for preventing the formation of ice according to claim 1, characterized in that the storage mass is accommodated in geometrically arranged cavities formed between two foils (31 and 33).

9. Means for preventing the formation of ice according to claim 8, characterized in that the cavities are made up of two bulges (56 and 57), whose depth (58) is greater than the radius (59).

10. Means for preventing the formation of ice on roads according to claim 8, characterized in that the foundation (38) of the road is connected to the road surfacing (30) by tensioned elements (35) which protrude through openings (39) in the foil (32).

11. Means for preventing the formation of ice according to claim 3, characterized in that vapor is used as the heat medium, which is collected in a tank (66) after condensation and from there conducted to the heat exchangers (61,63) by a conveying device (70).

12. Means for preventing the formation of ice according to claim 11, characterized in that the condensate (67) is conveyed by conveying means into the heat exchanger (61) and in that at the lowest point of this heat exchanger a condensate-bypass (74) conducts a small portion of the condensate formed into the condensate tank (66), while the other portion of the condensate is conducted into the condensate tank via the heat exchanger (63).

13. Means for preventing the formation of ice according to claim 1, characterized in that the storage bodies (34, 20, 42) are in good heat conductive communication with a heating means (22, 40).

14. A method of de-icing a road by means for preventing the formation of ice according to claim 11, characterized in that the conveying device (70) is switched on in a temperature range adjacent the temperature of crystallization of the storage mass and exceeding the latter by a predetermined amount, and switched off again when this range is exceeded, in that when the ambient temperature drops and is expected to drop below the freezing point and when simultaneously the road is wet, it is switched on and again switched off when the freezing point is exceeded or when the road has dried up, and in that in the case of a supercooled road it is switched on in dependance on meteorological indications, e.g. barometric drop and again switched off after the road has dried up.

15. Means for preventing the formation of ice according to claim 1 having in addition crystals (a) of a structure which is isotypic and/or epitaxic with respect to the storage mass, (b) are insoluble in the melted storage mass, (c) have a melting point above any operating temperature of the surface area, and (d) are uniformly distributed in the storage mass.

16. Means for preventing the formation of ice according to claim 13 wherein said heating means comprises an electric power supply, and having in addition means for switching on said power supply when an outer portion of the storage body drops to a temperature which is slightly above the temperature of crystallization of the storage mass in the storage body and switches off said electrical supply when the temperature of the storage mass exceeds the temperature of crystallization.

17. A means for preventing the formation of ice according to claim 1 having in addition a first heat exchanger in heat conductive communication with said surface, a second heat exchanger in heat conductive communication with said first heat exchanger and located in said storage body, a flowable heat medium connecting said exchangers, interruption means for interrupting the circulation of said heat medium, and a control means for operating said interruption means upon the presence of meteorological conditions conducive to the formation of black ice.

* * * * *